ACETOACETANILIDE SUBSTITUTED BY A PHENYLCARBAMOYLOXY GROUP

Wolfgang Rohr, Mannheim, and Adolf Fischer, Mutterstadt, Germany, assignors to Badische Aniline- & Soda-Fabrik Aktiengesellschaft, Ludwigshafen (Rhine), Germany
No Drawing. Filed June 14, 1971, Ser. No. 153,003
Int. Cl. C07c 125/06
U.S. Cl. 260—472       5 Claims

ABSTRACT OF THE DISCLOSURE

New and valuable substituted acetoacetanilides in which the acetoacetanilide is substituted in the meta-position by a phenylcarbamoyloxy group of the formula

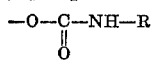

where R is phenyl or phenyl substituted by chlorine, bromine, iodine, fluorine, methyl, ethyl, chloromethyl, trifluoromethyl, methoxy, ethoxy, allyloxy and propargyloxy. These compounds are useful as herbicides.

This invention relates to new, substituted acetoacetanilides having a good herbicidal action and the use of these compounds as herbicides.

It is known to use methyl N-[3-(4'-fluorophenylcarbamoyloxy)-phenyl]-carbamate as a herbicide. However, its action is not satisfactory.

We have now found that substituted acetoacetanilides of the formula

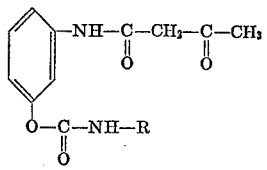

where R denotes an aromatic radical (phenyl) which may bear one or more substituents which may be identical or different and are selected from the group consisting of halogen (fluorine, chlorine, bromine, iodine), haloalkyl (trifluoromethyl, chloromethyl), alkyl (methyl, ethyl), an aliphatic oxy radical (methoxy, ethoxy, allyloxy, propargyloxy), alkylmercapto (methylmercapto), alkylsulfonyl or cyano, have a good herbicidal action.

The action is particularly in evidence on the unwanted plants *Stellaria media*, *Sinapis arvensis*, *Chenopodium album* and *Galinsoga parviflora*. The substituted acetoacetanilides are therefore suitable for use in the following crops: Beta spp., *Zea mays*, and *Triticum* spp. Application rates range from 1 to 3 kg. of active ingredient per hectare.

The new compounds may be prepared by reacting m-aminophenol with diketene to give m-hydroxyacetoacetanilide, which is subsequently converted with isocyanates to the carbamates of the invention. The compounds of the invention are also obtained by reacting m-nitrophenol with an isocyanate to give a m-nitrophenyl carbamate. The nitro group is subsequently reduced and the amine obtained reacted with diketene to form the new acetoacetanilide.

EXAMPLE 1

At 5° to 20° C. and while stirring, 34 parts (by weight) of diketene was added to a mixture of 43.6 parts of m-aminophenol, 150 parts of benzene and 150 parts of ethyl acetate. The reaction mixture was subsequently stirred for 2 hours at 50° to 60° C.

Cooling was effected and the precipitated product was suction filtered and washed with a 1:1 mixture of benzene and ethyl acetate. The crude substance melts at 130° to 132° C.

The compound (3-hydroxyacetoacetanilide) has the following structural formula:

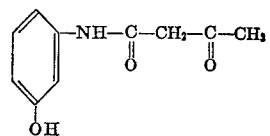

At 20° to 25° C. and while stirring, a solution of 15.3 parts of p-chlorophenyl isocyanate in 30 parts of toluene was added to a suspension of 19.3 parts of 3-hydroxyacetoacetanilide and 0.5 part of dibutyl tin diacetate in 90 parts of toluene. The reaction mixture was subsequently stirred for 6 hours at 90° to 100° C. Cooling was effected, and the crude product suction filtered and recrystallized twice from 75% methanol; melting point: 142° to 143° C.

The compound — 3 - (4'-chlorophenylcarbamoyloxy)-acetoacetanilide—has the following structural formula:

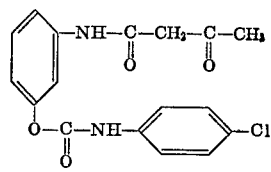

The following substances are obtained analogously:

3-(3'-trifluoromethylphenylcarbamoyloxy)-acetoacetanilide, M.P. 139° to 140° C.;
3-(3'-methylphenylcarbamoyloxy)-acetoacetanilide, M.P. 124° to 125° C.;
3-phenylcarbamoyloxyacetoacetanilide, M.P. 120° to 122° C.;
3-(3',4'-dichlorophenylcarbamoyloxy)-acetocetanilide, M.P. 110° to 112° C.;
3-(3'-chloro-4'-bromophenylcarbamoyloxy)-acetoacetanilide;
3-(4'-fluorophenylcarbamoyloxy)acetoacetanilide, M.P. 124° C.;
3-(3'-methoxyphenylcarbamoyloxy)-acetoacetonilide.

EXAMPLE 2

While stirring, 115 parts by weight of phenyl isocyanate was added in portions to a mixture of 139 parts by weight of m-nitrophenol, 270 parts by weight of tetrahydrofuran and 2 parts by weight of dibutyl tin diacetate; cooling was effected to keep the temperature below 55° C. To complete the reaction, the mixture was stirred at room temperature for 5 hours. The reaction product was subsequently suction filtered and washed once with a small amount of cold tetrahydrofuran; melting point: 130° C.

The compound (3-nitrophenyl-N-phenylcarbamate) has the following structural formula:

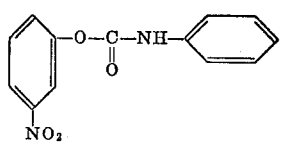

156 parts of 3-nitrophenyl-N-phenylcarbamate was dissolved in 1,450 parts of ethyl acetate. 4 parts of catalyst (10% palladium on carbon) was added to the solution and the whole placed in a shaking autoclave. Hydrogen was added to the contents at a pressure of 1 to 4 atmospheres gauge until the pressure remained constant. The catalyst was then filtered off and the solvent evaporated off at subatmospheric pressure. The residue was 3-aminophenyl-N-phenylcarbamate; melting point: 140° C.

The compound has the following structural formula:

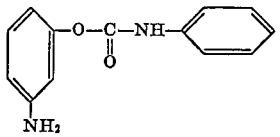

3 - aminophenyl - N-3'-trifluoromethylphenylcarbamate melting at 134° C. is obtained by reducing 3-nitrophenyl-N-3'-trifluoromethylphenylcarbamate in accordance with the above process.

Similarly, 3-aminophenylcarbamates in general may be prepared from the corresponding 3-nitrophenylcarbamates.

While stirring, 14.5 parts by weight of diketene was added to a solution of 50.7 parts by weight of 3-aminophenyl-N-3'-trifluoromethylphenylcarbamate in 180 parts by weight of ethyl acetate. The reaction mixture was subsequently kept for 6 hours at 50° to 60° C. The solvent was then evaporated in vacuo and the solid residue recrystallized from a mixture of ethyl acetate and ligroin; melting point: 139° to 140° C.

The compound—3-(3'-trifluoromethylphenylcarbamoyloxy)-aceto-acetanilide—has the following structural formula:

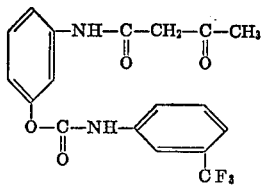

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following example demonstrates the use of the new active ingredients.

EXAMPLE 3

The plants Triticum aestivum, Zea mays, Beta vulgaris, Stellaria media, Sinapis arvensis and Chenopodium album were treated at a growth height of 3 to 12 cm. with 1.5 kg. per hectare of 3-(3'-trifluoromethylphenylcarbamoyloxy)-acetoacetanilide (I), with 1.5 kg. per hectare of 3(4'-chlorophenylcarbamoyloxy)-acetoacetanilide (II), with 1.5 kg. per hectare of 3-phenylcarbamoyloxyacetoacetanilide (III), with 1.5 per hectare of 3-(3'-methylphenylcarbamoyloxy)-acetoacetanilide (IV), and, for comparison, with 1.5 kg. per hectare of methyl-N-[3-(4'-fluorophenylcarbamoyloxy)-phenyl]-carbamate (V), each active ingredient being dispersed in 500 liters of water per hectare.

After 3 to 4 weeks, it was ascertained that active ingredients I, II, III and IV had superior compatibility with the crop plants and a stronger action on the broadleaved and grassy weeds than V.

The results of the experiment are given in the following table:

| | Active ingredients | | | | |
|---|---|---|---|---|---|
| | I | II | III | IV | V |
| Crop plants: | | | | | |
| Triticum aestivum | 0 | 0 | 0 | 0 | 15 |
| Zea mays | 0 | 0 | 0 | 0 | 15 |
| Beta vulgaris | 0 | 0 | 0 | 0 | 30 |
| Unwanted plants: | | | | | |
| Stellaria media | 95 | 100 | 90 | 95 | 80 |
| Sinapis arvensis | 95 | 100 | 90 | 95 | 80 |
| Chenopodium album | 95 | 95 | 85 | 90 | 80 |

NOTE.—0=no damage; 100=complete destruction.

The action of the following compounds corresponds to that of active ingredients I to IV:

3-(4'-fluorophenylcarbamoyloxy)-acetoacetanilide and
3-(3'-chloro-4'-bromophenylcarbamoyloxy)-acetoacetanilide.

EXAMPLE 4

90 parts by weight of Compound I is mixed with 10 parts by weight of N-methyl-α-pyrrolidone. A mixture is obtained which is suitable for application in the form of very fine drops.

EXAMPLE 5

20 parts by weight of Compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of Compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqeosu dispersion is obtained containing 0.02% by weight of the active ingredient.

EXAMPLE 7

20 parts by weight of Compound IV is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of Compound I is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of Compound II is intimately mixed with 97 parts by weight of particulate kaolin. A dust is obtained containing 3% by weight of the active ingredient.

EXAMPLE 10

30 parts by weight of Compound III is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. A compound of the formula

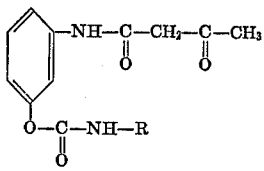

wherein R is phenyl or phenyl substituted by chlorine, bromine, iodine, fluorine, methyl, ethyl, chloromethyl, trifluoromethyl, methoxy, ethoxy, allyloxy and propargyloxy.

2. 3 - (3' - trifluoromethylphenylcarbamoyloxy)-acetoacetanilide.
3. 3-(3'-methylphenylcarbamoyloxy)-acetoacetanilide.
4. 3-phenylcarbamoyloxyacetoacetanilide.
5. 3-(4'-chlorophenylcarbamoyloxy)-acetoacetanilide.

References Cited
UNITED STATES PATENTS
3,625,992   12/1971   Duerr et al. _____ 260—472

LORRAINE A. WEINBERGER, Primary Examiner
L. THAXTON, Assistant Examiner

U.S. Cl. X.R.
71—105, 111; 260—465 D, 470

UNITED STATES PATENT OFFICE
CERTIFICATE OF CORRECTION

Patent No. 3,784,564    Dated January 8, 1974

Inventor(s) Wolfgang Rohr and Adolf Fischer

It is certified that error appears in the above-identified patent and that said Letters Patent are hereby corrected as shown below:

Column 1, line 5, "Aniline-" should read -- Anilin- --.

Column 2, line 38, "acetocetanilide" should read -- acetoacetanilide --.

Column 2, line 45, "acetoacetonilide" should read -- acetoacetanilide --

Column 2, line 47, "115" should read -- 125 --.

Column 4, line 48, "aqueosu" should read -- aqueous --.

Signed and sealed this 5th day of November 1974.

(SEAL)
Attest:

McCOY M. GIBSON JR.　　　　　C. MARSHALL DANN
Attesting Officer　　　　　　Commissioner of Patents

UNITED STATES PATENT OFFICE
CERTIFICATE OF CORRECTION

Patent No. 3,784,564     Dated January 8, 1974

Inventor(s) Wolfgang Rohr and Adolf Fischer

It is certified that error appears in the above-identified patent and that said Letters Patent are hereby corrected as shown below:

Column 1, ninth line, insert

--30    Foreign Application Priority Data
        July 10, 1970    Germany . . . . P 20 34 242.1

Signed and sealed this 28th day of January 1975.

(SEAL)
Attest:

McCOY M. GIBSON JR.                C. MARSHALL DANN
Attesting Officer                  Commissioner of Patents